United States Patent [19]

Shermer et al.

[11] 4,330,407

[45] May 18, 1982

[54] PROCESS FOR CLARIFYING ALGAE-LADEN WASTE WATER STREAM

[75] Inventors: David A. Shermer; Parsons P. Jim, both of Lake Charles, La.; Dale R. Laurance, Trumbull, Conn.

[73] Assignee: Olin Corporation, New Haven, Conn.

[21] Appl. No.: 182,339

[22] Filed: Aug. 29, 1980

[51] Int. Cl.³ .............................. C02F 1/56; C02F 3/32
[52] U.S. Cl. .................................... 210/602; 210/718; 210/725; 210/727; 210/734
[58] Field of Search .................. 47/1.4; 210/602, 702, 210/718, 723–728, 734, 738, 750

[56] References Cited

U.S. PATENT DOCUMENTS

| | | | |
|---|---|---|---|
| 3,155,609 | 11/1964 | Pampel | 210/622 |
| 3,431,200 | 3/1969 | Davis et al. | 47/1.4 |
| 3,521,400 | 7/1970 | Ort | 47/1.4 |
| 3,565,797 | 2/1971 | Gresham | 210/151 |
| 3,836,681 | 9/1974 | Dodd | 210/771 |
| 4,201,867 | 5/1980 | Gasper | 560/205 |

FOREIGN PATENT DOCUMENTS 467931 4/1975 U.S.S.R. .............................. 210/702

OTHER PUBLICATIONS

Kirk–Othemer, *Encyclopedia of Chemical Technology*, Second Ed., vol. 22, pp. 65–82, 1970.
Perry et al., *Chemical Engineers Handbook*, 5th Edition, pp. 19-44–19-57, 1973.

Primary Examiner—Peter A. Hruskoci
Attorney, Agent, or Firm—William A. Simons; Thomas P. O'Day

[57] ABSTRACT

Disclosed is a process for clarifying an algae-laden waste water stream wherein the waste water stream is deaerated and passed through a substantially light-free environment before coagulating aids are added to the water stream and the water stream is clarified in a coagulated solids settling step. The deaeration and light-free travel allow the algae to be more easily settled.

21 Claims, 2 Drawing Figures

PROCESS FOR CLARIFYING ALGAE-LADEN WASTE WATER STREAM

BACKGROUND OF THE INVENTION

1. Field of the Invention

The present invention relates to a process for clarifying algae-laden waste water stream to form a waste sludge and an effluent water stream having a lower amount of total suspended solids.

2. Description of the Prior Art

Algae-laden waste water streams are generally very expensive and difficult to clarity to low suspended solids levels. Normal sedimentation techniques (e.g., gravity-settling clarifiers) by themselves will not work with many algae species. The algae exhibits a specific gravity nearly equal to that of water and many species of algae live in the water in a highly dispersed manner. Besides these dispersed species not settling easily, they also may interfere with the settling of other solids that may be dispersed in water. In the past, it was found that if a coagulation aid was added to an untreated algae-laden waste water stream, coagulation would occur but settling would not rapidly follow.

Rather than directly trying to coagulate suspended solids in algae-laden waste water streams, persons skilled in the treatment of industrial waste water streams first attempted to control algal growth by adding copper sulfate or like chemicals to treatment ponds where algae was produced. See Kirk-Othmer, *Encyclopedia of Chemical Technology*, Second Ed., Vol. 22, pages 65–82 (1970). However, such chemical control methods have disadvantages. First, the use of chemicals like copper sulfate on a large scale can be expensive. Moreover, the addition of such chemicals to waste water streams introduces still other contaminants to such streams which may have to be removed later on.

Accordingly, there is a need in the art to improve conventional gravity-settling methods for clarifying algae-laden waste water streams without adding any further chemicals to these streams. The present invention is a solution to this need.

BRIEF SUMMARY OF THE INVENTION

The present invention, therefore, is a process for clarifying algae-laden waste water streams, wherein these streams have suspended solids which contain algae. This process comprises the steps of:

(a) deaerating the waste water stream containing algae to remove at least a portion of the gaseous oxygen attached to the algae in the waste water stream;

(b) passing the waste water stream through a substantially light-free environment for sufficient time to cause at least a major portion of the algae to revert to its nocturnal phase;

(c) then adding a sufficient amount of at least one coagulation aid to the waste water stream containing algae in its nocturnal phase to cause coagulation of at least a portion of the suspended solids while in a substantially light-free environment; and (d) then settling the coagulated solids in the waste water stream in a substantially light-free environment in order to form a waste sludge of coagulated solids and an effluent water stream having a markedly lower amount of total suspended solids.

DETAILED DESCRIPTION

Waste water streams treated by the present invention may be any algae-laden waste water stream from an industrial or municipal operation, or the like. The waste water stream may include either rainstorm runoff, waste water from industrial process streams, sewage and the like, or combinations thereof, which contain an undesirable amount of solids and algae. In the last few years, stricter governmental regulations are requiring the level of Total Suspended Solids (TSS) in the waste water streams which enter public waterways to be lower than what was accepted in the past. Specifically, in at least one case, the TSS of the effluent water stream was limited by governmental regulation to no more than 60 mg. of TSS per liter of water.

For the present invention, waste water streams having more than about 100 mg. of TSS per liter of water of which algae constitutes at least 10% by weight of TSS may be treated. Preferably, it would be acceptable to treat any waste water stream which contained from about 200 mg. to 2,000 mg. of TSS per liter of water. Also, in some instances, it is preferable to have the waste water stream pass through a floating oil boom and a trash screen to remove any appreciable amounts of oil and trash from the stream before this treatment process.

Figure 1:
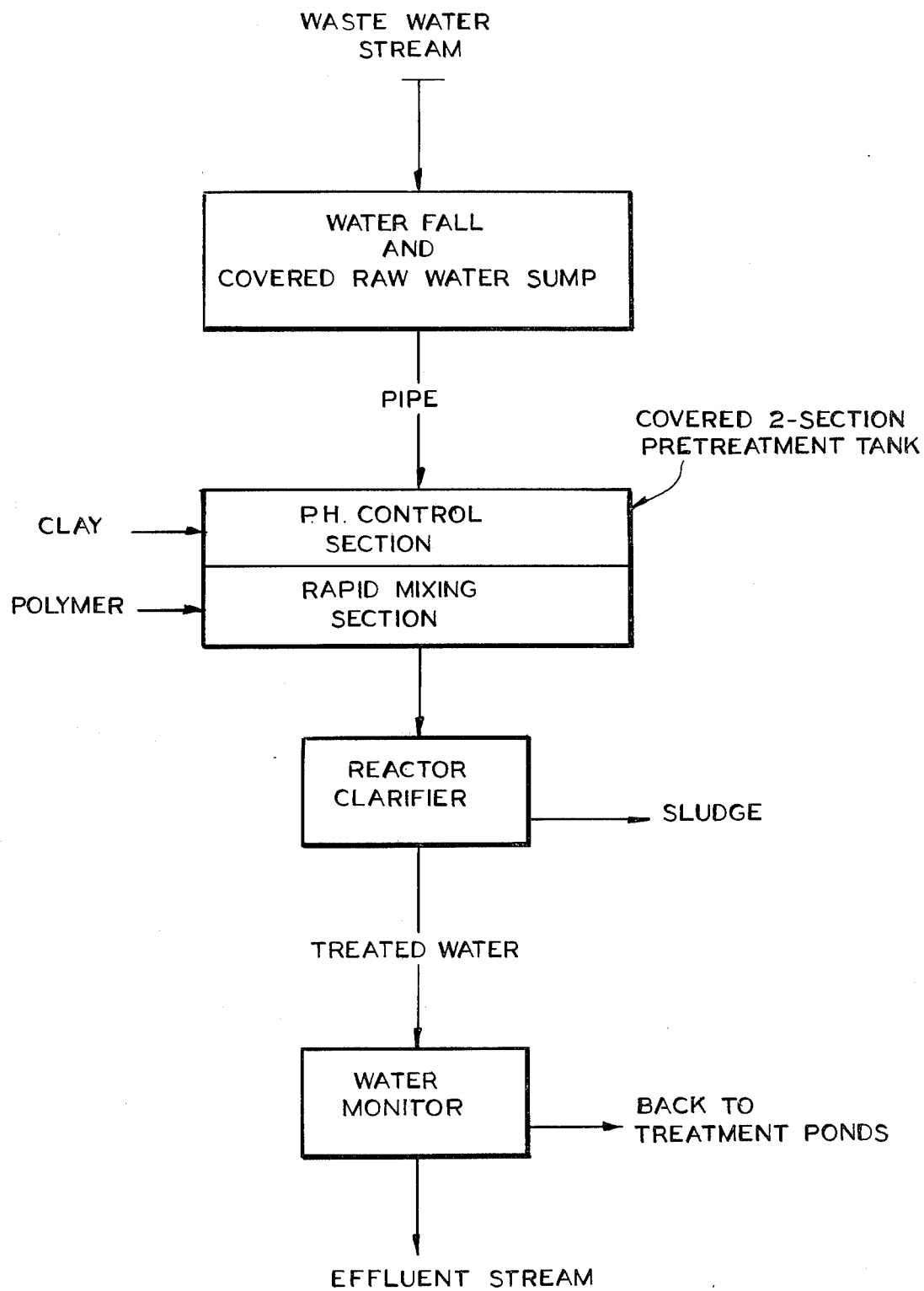
FIG. 1 is a flow chart of one preferred embodiment of the present invention.

In the first step of the preferred embodiment shown in FIG. 1, the algae-laden waste water stream is cascaded over a waterfall and briefly held in a covered raw water sump (i.e., concrete tank). The waterfall has the effect of deaerating the waste water stream and tends to loosen oxygen bubbles attached to the algae. The waterfall should be of sufficient height to cause a desired amount of deaeration. It has been found that a waterfall of even 2 feet in height is sufficient to cause some deaeration.

After the waterfall, the water stream is held in the sump briefly to allow any entrapped air in the water to be removed. Preferably, the sump is covered to initiate the algae into reverting to their nocturnal phase. However, it should be noted that other means for reducing the free oxygen in the waste water stream besides a waterfall and sump may be herein employed. Centrifuges and the like are some examples of such equivalent means.

After the waste water stream has been held in the sump for the desired time, it is passed through a substantially light-free environment for sufficient time to cause at least a major (i.e., about 50% by weight) portion of the algae contained in the water to revert to their nocturnal phase. The preferred light-free environment is an elongated enclosed zone such as a pipe, although other equivalent means such as tanks may be utilized. In the preferred process, the waste water stream from the sump is pumped through the pipe to a two-section pretreatment tank. A suitable detention time in the pipe may be as little as 15 minutes although it is more preferred to utilize from 20–60 minutes detention time.

The present invention is based on the photosynthesis principle that green plants, like algae, generate oxygen during the daylight periods and generate $CO_2$ and consume $O_2$ in their nocturnal phase. It has been found that many species of algae have a gaseous oxygen bubble or layer attached to them during daylight periods which is smaller or absent during their nocturnal periods. By coagulating these algae species during the daylight, the resulting flocs have the undesirable tendency to float because of the attached oxygen bubble. It has also been recognized that by coagulating the algae when they are in their nocturnal phase, the resulting flocs will be more likely to settle because of the smaller size of the gaseous oxygen bubble.

It has been further discovered that a deaeration step will tend to loosen any $O_2$ bubbles attached to the algae and make a later step of gravity-settling clarification more efficient and may also reduce the time needed for algae to revert to their nocturnal phase (having a smaller or absence of attached oxygen) in a light-free environment.

After travelling through the substantially light-free environment, the waste water stream is treated with at least one coagulation aid to cause coagulation of at least a portion of the suspended solids in the waste water stream. This treatment should be carried out in a light-free environment so that the algae will not be reactivated and form small oxygen bubbles which could later interfere with the settling of the solids.

In the preferred process shown by FIG. 1, the waste water stream is passed from the pipe into a covered two-section pretreatment tank. In the first section, called the pH adjustment section, clay is added as a coagulation aid to the water to create a heavier floc with the suspended solids already in the water, the combination of which will then settle more easily. Preferably the clay may be added in an about 4% to about 6% aqueous slurry at 1–20 gallons per minute to maintain 5–100 parts per million clay in the water. A preferred type of clay is bentonite although attapulgite clay and the like may also be used.

Also in this first section of the pretreatment tank, the pH of the water may be adjusted. This can be easily done by monitoring the pH of the waste water stream with a pH electrode and adding either acid (e.g., HCl) or base (e.g., NaOH) to keep the pH of the water stream in the range of 6 to 9. Strict governmental regulations generally provide that treated waste water streams must have a pH within that range before they can be disposed of in rivers or other public waterways.

In the preferred process shown in FIG. 1, a water treatment polymer is added as a coagulation aid to the second section of the pretreatment tank, namely, the rapid mixing section. The water treatment polymer serves to neutralize electric charges on the solids suspended in the water and to coagulate them together into larger particles which will settle faster. The clay particles provide a base for these suspended solid particles to grow from and help increase their weight and make them settle faster.

The water treatment polymers may be either in dry or liquid form when added. Preferably, the polymer is in a dilute aqueous solution from 0.01% to 1% by weight polymer. The preferred amount of polymer will vary depending upon many factors such as the specific polymer used and the make-up of the waste water stream. Preferably, amounts of polymer added may range from about 0.1 to 100 parts, more preferably from about 1 to 10 parts, by weight per million parts of water treated. One particular method of forming aqueous slurries of water treatment polymers is described in U.S. Pat. No. 4,201,867 which issued to Gasper on May 6, 1980. This patent is incorporated herein by reference in its entirety.

Typical water treatment polymers which may be useful by the present invention include polyacrylamides, cationic-modified polyacrylamides, anionic-modified polyacrylamides, polyacrylates and polyquaternaryamides that are conventionally used in water treatment. These polymers usually are characterized as having a relatively high viscosity (e.g., from about 250 to greater than about 5,000 centipoise at 25° C.) and relatively high molecular weights (e.g., in the 200,000 to over 10 million range). However, additional water treatment polymers may be used; and, other coagulant aids besides clay and water treatment polymers may be used in the present invention.

Figure 2:
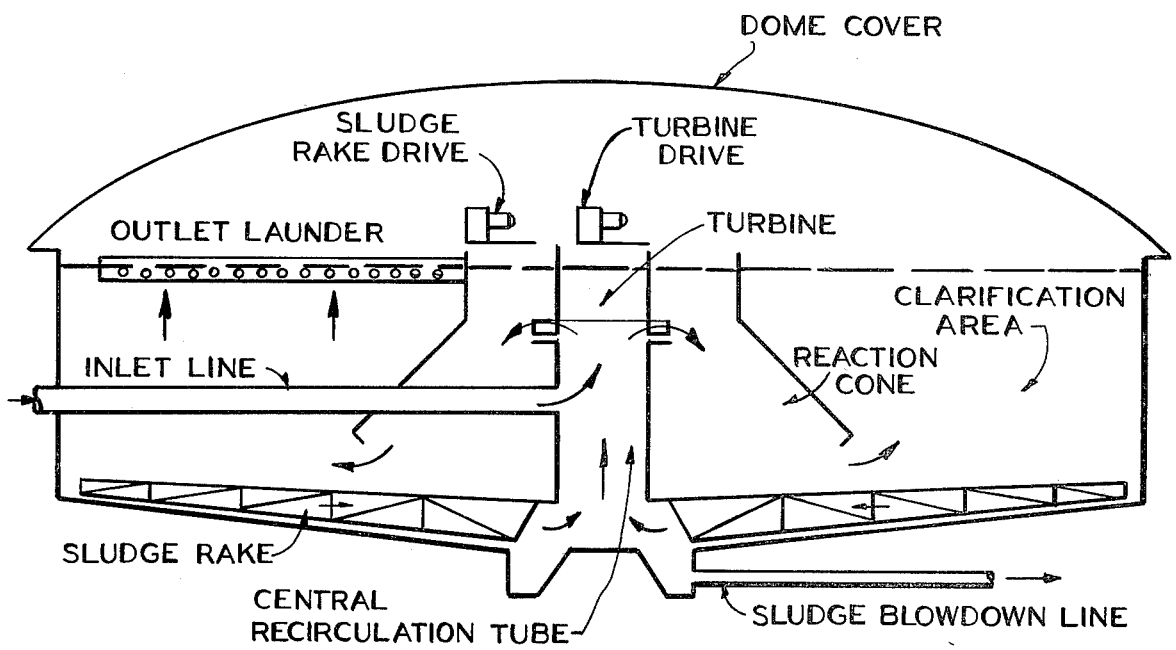
FIG. 2 is a detailed view of a reactor clarifier which is a preferred apparatus for clarifying algae-laden waste water streams according to the present invention.

The coagulated mixture of solids such as algae, polymer and clay leaves the rapid mixing section of the pretreatment tank by a pipe to a settling apparatus such as a gravity settling clarifier that is in a substantially light-free environment. The waste water stream is clarified therein to form a waste sludge and an effluent water stream which has a lower amount of total suspended solids than the waste water stream which entered the treatment process. Any gravity settling clarifier apparatus suitable for this waste water treatment may be used. One preferred type of clarifier is a reactor-clarifier such as shown in FIG. 2. A detailed discussion of gravity settling clarifiers and reactor-clarifiers in particular is shown in Perry, *Chemical Engineer's Handbook*. Fifth Ed., pages 19–44 to 19–57 (1973). These pages of this reference are incorporated herein in their entirety.

Specific design and operation parameters of gravity settling clarifiers, and reactor-clarifiers, in particular, are not critical to the present invention. One having ordinary skill in this art would be able to design and operate such clarifiers for such purposes of the present invention. The only important parameter as to the design of such clarifiers is that they be covered so that the water stream therein would be in a substantially light-free environment. The entire process is preferably operated at ambient temperatures; however, the process may be operated at temperatures in the range from about 10° C. to about 60° C.

When a reactor-clarifier such as shown in FIG. 2 is utilized for the present invention, the waste water stream from the pretreatment tank enters via the inlet line. The stream enters the clarifier in the central circulation tube and mixes with recirculating sludge. This mixture is forced upward and outward by the pumping action of a turbine pump. As the mixture passes through the turbine, it is subjected to a second rapid mixing. The mixing in the reaction cone outside of the turbine is gentler and flocculation begins to take place. The flow of waste water sludge passes down within the reaction cone to an outer clarification area. The clarification area and the reaction cone are separated by a partition. In the clarification area, the velocity decreases and the suspended solids settle out. The clear water overflows into the outlet launders and flows by gravity to a surge tank. The settled solids form a sludge on the bottom of the clarifier. The sludge is moved to the center of the clarifier by a sludge rake. In the center, the sludge is either recirculated upward by the pumping action of the turbine or removed from the clarifier via a sludge blowdown line and valve system. Both the turbine and the sludge rake are driven by motors at the top of the clarifier. As shown in FIG. 2, the preferred reactor-clarifier is covered by a dome cover.

In the preferred operation of the reactor-clarifier, a sludge blanket is formed within the clarifier. In this operation, the amount of sludge in the clarifier is allowed to increase until a distinct sludge-clear liquid interface has formed. This interface is kept above the lower edge of the partition separating the reaction cone from the clarification area. By using this sludge blanket, water passes through it and the suspended solids contained therein will be filtered out.

The waste sludge removed from the gravity settling clarifier normally contains about 0.1 to 0.5% by weight solids. The sludge is blown down from the clarifier as shown in FIG. 2 by a sludge blowdown line and a valve system. The sludge is then disposed of by recycling it back to treatment ponds, or it may be dried or compacted first. Furthermore, sludge might be utilized in useful ways such as fertilizer.

The treated water which overflowed from the top of the reactor-clarifier in FIG. 2 via the outlet launder is sent to a surge tank. In the surge tank, the pH and total suspended solids are both monitored. If the pH is less than 6 or greater than 9 or if the TSS is greater than about 60 mg. per liter of water then the treated effluent water stream is preferably diverted back to the beginning of the process of the present invention. If treated water stream has a pH within the range of 6 to 9 and a TSS of less than about 60 mg., more preferably 25 mg., per liter of water, then it may preferably be disposed of by release into a river or other public waterway. Alternatively, such treated water streams may be used in some instances as potable water supplies.

The following example better illustrates the process of the present invention. Specifically, it utilizes the process illustrated in FIGS. 1 and 2. All parts and percentages are by weight unless otherwise explicitly indicated.

EXAMPLE 1

Raw waste water from a chemical plant was collected in two treatment ponds. The waste water was composed of waste water from processing streams, storm water runoff and water from recycled sludge produced by the process of the present invention. The combined waste water stream coming from these ponds had an average Total Suspended Solids (TSS) concentration of about 200 mg. per liter of water and contained algae. The maximum rate of the combined waste water stream was 7,000 gallons per minute (gpm) from the ponds.

The algae-laden waste water stream flowed by gravity from the treatment ponds through a sluice gate and cascaded two feed in a waterfall into a covered raw water sump. The waterfall deaerates the water and tends to loosen any oxygen bubbles attached to the algae. The sump is a concrete structure having a water volume of approximately 11,000 gallons, which provides about 1.5 minutes detention time at 7,000 gpm.

Raw water from the sump was pumped by one or two vertical turbine raw water transfer pumps, each having a capacity of 3,500 gpm. The pumped raw water flowed through 24 inch diameter polyethylene plastic pipe into a two-section pretreatment tank. The length of the plastic pipe is approximately 1.25 miles long and the detention time (dark time) in the pipe line is about 25 minutes at 7,000 gpm flow.

The pretreatment tank is a covered, concrete structure of two adjacent sections—the pH Control Section and the Rapid Mix Section. Both sections are about 16 feet high and, during operation, normal water depths were about 14 feet high. The influent water from the plastic pipe entered the top of the pH Control Section (35,000 gal. capacity) and was vigorously agitated by a pH Control Mixer and continuously monitored by a glass pH electrode located at the bottom exit of the pH Control Section. Flow of acid (HCl) or caustic (NaOH) into the tank was automatically controlled to keep the pH in the range of 6 to 9.

An aqueous slurry containing 4% to 6% by weight bentonite clay was also added continuously to the pH Control Section at 1 to 10 gpm to maintain 6 to 87 ppm bentonite in the water. The clay was employed to coagulate with the solids in the water and create a heavier floc which settled more easily.

The water left the pH Control Section into the Rapid Mix Section via an exit in the bottom of both sections. In the Rapid Mix Section (21,000 gal. capacity), a 0.05% aqueous slurry of a cationic-modified polyacrylamide polymer (HF-849, manufactured by Hercules Corporation of Wilmington, Del.) was added to the clay-water mixture. Agitation was provided by a mixer. The polymer served to neutralize electric charges on the solids suspended in the water and to bind them into larger particles which settled faster. The amount added was to maintain about 2 ppm of the polymer in the water.

The coagulated mixture of solid such as algae, polymer, and clay left the pretreatment tank from the top of the Rapid Mix Section. The water stream that left the Rapid Mix Section was split equally and flowed by gravity into two 90-foot diameter reactor-clarifiers by means of two pipes of about 100 feet in length. These clarifiers were also covered to keep out sunlight. The reactor clarifiers were manufactured by the Eimco Division of Envirotech Corporation located in Salt Lake City, Utah.

In each clarifier, the water stream from the pretreatment tank entered a central recirculation tube from the side and mixed with recirculating sludge as shown in FIG. 2. That mixture was forced upward by the pumping action of a turbine. As the mixture passed through the turbine, it was subjected to a second rapid mixing. After passing through the turbine, the mixture passed outward into the reaction cone of the clarifier. The mixing in the reaction cone was gentler and flocculation began to take place. The mixture flowed down inside the reaction cone into the outer clarification area. Here the velocity decreased and the solids settled out. The clarified water overflowed into outlet launders and flowed by gravity to a treated-water surge tank.

The excess sludge settled on the bottom of the clarifier and was moved to the bottom center of the clarifier by the sludge rake. It was either picked up and recirculated by the pumping action of the turbine, as described above, or blown downward to a sludge sump by a blowdown valve. The amount of sludge increased in the clarifier until a distinct sludge-clear liquid interface has formed. This interface was kept above the lower edge of the reaction cone. By doing this, a sludge blanket was formed which had a filtering effect on the water passing through it.

The waste sludge removing from the clarifiers contained approximately 0.25% by weight solids. It was produced at rates of 500 to 1,200 gpm depending on the inlet TSS and flow rate. Waste sludge from the sump was pumped to the treatment ponds by vertical centrifugal sludge transfer pumps.

The treated water was continuously monitored for TSS and pH. If the TSS was less than 60 ppm and if the pH was in the range from 6.5 to 8.5, then the treated water was sent to a nearby river. If the TSS was greater than 60 ppm, or the pH was greater than 8.5 or below 6.5, then the treated water was diverted back to the treatment ponds for recycle through this water treatment again.

What is claimed is:

1. A process for clarifying an algae-laden waste water stream, said waste stream having suspended solids containing algae with oxygen bubbles attached thereto comprising:
   (a) deaerating said waste water stream containing algae to remove at least a portion of the gaseous oxygen attached to said algae in said waste water stream;
   (b) passing the waste water stream through a substantially light-free environment for sufficient time to cause at least a major portion of said algae to revert to its nocturnal phase, wherein the oxygen bubbles attached to said algae are smaller or absent;
   (c) then adding a sufficient amount of at least one coagulation aid to said waste water stream containing algae in its nocturnal phase to cause coagulation of at least a portion of said suspended solids while in a substantially light-free environment; and
   (d) then settling the coagulated solids in said waste water stream while in a substantially light-free environment in order to form a waste sludge of said coagulated solids and an effluent water stream having a lower amount of total suspended solids than said waste water stream entering step (a).

2. The process of claim 1, wherein said deaerating (a) is carried out by cascading said waste water stream over a waterfall.

3. The process of claim 1, wherein said deaerating (a) is carried out in a substantially light-free environment.

4. The process of claim 1, wherein step (b) is carried out in an elongated enclosed zone.

5. The process of claim 1, wherein said coagulation aid added to said waste water stream in step (c) is clay.

6. The process of claim 5, wherein said clay is bentonite.

7. The process of claim 1, wherein said coagulation aid added to said waste water stream in step (c) is a water treatment polymer.

8. The process of claim 7, wherein said water treatment polymer is a cationic-modified polyacrylamide.

9. The process of claim 1, wherein the pH of said waste water stream is adjusted to within the range of 6 to 9 during step (c).

10. The process of claim 1, wherein two coagulant aids are added sequentially to said waste water stream.

11. The process of claim 10, wherein the first coagulant aid is clay and the second coagulant aid is a water treatment polymer.

12. The process of claim 11, wherein the pH of said waste water stream is adjusted to within the range of 6 to 9 at the time the clay is added.

13. The process of claim 1, wherein said clarifying step (d) is carried out in a reactor-clarifier.

14. The process of claim 1, wherein said formed effluent stream of step (d) has a suspended solids content of less than 60 mg. solids per liter of water and a pH in the range of from 6 to 9.

15. The process of claim 14, wherein said formed effluent stream of step (d) has a suspended solids content of less than 25 mg. solids per liter of water.

16. The process of claim 15, wherein said effluent stream is disposed of in a waterway.

17. A process for clarifying an algae-laden waste water stream, said waste water stream having more than 100 mg. of total suspended solids per liter of water and algae with oxygen bubbles attached thereto, comprising at least 10% by weight of said total suspended solids, comprising:
   (a) deaerating said waste water stream by cascading over a waterfall in order to remove at least a portion of the gaseous oxygen attached to said algae, said deaerating being carried out in a substantially light-free environment;
   (b) passing said waste water stream through a substantially light-free pipe for sufficient time to cause at least a major portion of said algae to revert to its nocturnal phase, wherein the oxygen bubbles attached to said algae are smaller or absent;
   (c) then adding a sufficient amount of clay to said waste water stream containing algae in its nocturnal phase, followed by adding a sufficient amount of a water treatment polymer to said waste water stream while in a substantially light-free environment, said amounts being sufficient to cause coagulation of at least a portion of said suspended solids; and
   (d) then settling the coagulated solids in said waste water stream in a reactor-clarifier while in a substantially light-free environment in order to form a waste sludge of coagulated solids and an effluent water stream having a lower amount of total suspended solids than said waste water stream entering step (a).

18. The process of claim 17, wherein the pH of said waste water stream is adjusted to the range from 6 to 9 when said clay is added.

19. The process of claim 18, wherein said clay is bentonite.

20. The process of claim 19, wherein said water treatment polymer is a cationic-modified polyacrylamide.

21. The process of claim 20, wherein said formed effluent stream of step (d) has a suspended solids content of less than 60 mg. solids per liter of water and a pH in the range of from about 6 to 9.

* * * * *